United States Patent
Fischer et al.

(10) Patent No.: US 10,101,161 B2
(45) Date of Patent: Oct. 16, 2018

(54) SEAMLESS DISPLAY OF OBJECTS

(71) Applicant: Harman Becker Automotive Systems GmbH, Karlsbad (DE)

(72) Inventors: Martin Fischer, Munich (DE); Carsten-Christian Spindler, Karlsruhe (DE); Alexey Pryakhin, Munich (DE)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 531 days.

(21) Appl. No.: 14/048,696

(22) Filed: Oct. 8, 2013

(65) Prior Publication Data
US 2014/0101151 A1   Apr. 10, 2014

(30) Foreign Application Priority Data
Oct. 8, 2012 (EP) .................................. 12187621

(51) Int. Cl.
*G06F 17/30* (2006.01)
*G01C 21/00* (2006.01)
*G01C 21/32* (2006.01)

(52) U.S. Cl.
CPC ............ *G01C 21/00* (2013.01); *G01C 21/32* (2013.01); *G06F 17/30241* (2013.01); *G06F 17/30595* (2013.01)

(58) Field of Classification Search
CPC ... G01C 21/32; G01C 21/00; G06F 17/30241; G06F 17/30595
See application file for complete search history.

(56) References Cited

U.S. PATENT DOCUMENTS

| | | | | |
|---|---|---|---|---|
| 6,025,843 A * | 2/2000 | Sklar | ................. | G06F 17/30241 715/841 |
| 6,081,803 A | 6/2000 | Ashby et al. | | |
| 7,532,979 B2 * | 5/2009 | Fuchs | .................... | G01C 21/32 701/438 |
| 8,990,012 B2 * | 3/2015 | Sawai | ............... | G06F 17/30241 701/450 |
| 2003/0212650 A1 * | 11/2003 | Adler | ................ | G06F 17/30259 707/999.001 |

(Continued)

FOREIGN PATENT DOCUMENTS

WO   WO 2011/118422 A1   9/2011

OTHER PUBLICATIONS

European Search Report dated Apr. 11, 2013, pp. 1-6, European Patent Application No. 12 187 621.3-1557, European Patent Office, Rijswijk, Netherlands.

*Primary Examiner* — Scott A. Waldron
(74) *Attorney, Agent, or Firm* — Artegis Law Group, LLP

(57) ABSTRACT

A system may generate a database of a geographical map of a navigation device. The geographical map covering a geographical area which is divided into several update regions. The system may identify at least one object in the geographical map which covers an object area in the geographical area. The object area can be divided into different parts which are located in different update regions. The system can store in the database, for each of said at least one object, information indicating that the object area overlaps with plural update regions, the information including pointers to update regions in which the respective different parts of the object area are stored.

16 Claims, 6 Drawing Sheets

| GLOBAL IDENTIFIER | UR ID | PART ID | TILE ID |
|---|---|---|---|
| 13 | 3 | 314 | 314-008659 |
| 13 | 5 | 536 | 536-095349 |
| 13 | 9 | 751 | 751-313239 |
| | | | |

53a  53b  53c  53d  — 53

(56) References Cited

U.S. PATENT DOCUMENTS

| | | | | |
|---|---|---|---|---|
| 2004/0220957 | A1* | 11/2004 | McDonough | G06F 17/30241 |
| | | | | 707/999.102 |
| 2007/0185649 | A1* | 8/2007 | Geilich | G01C 21/32 |
| | | | | 701/532 |
| 2009/0063424 | A1* | 3/2009 | Iwamura | G06F 17/30241 |
| | | | | 707/999.003 |
| 2010/0023251 | A1* | 1/2010 | Gale | G01C 21/00 |
| | | | | 701/533 |
| 2010/0299370 | A1 | 11/2010 | Otto | |
| 2011/0179080 | A1* | 7/2011 | Miyazaki | G06F 17/30241 |
| | | | | 707/772 |
| 2013/0147820 | A1* | 6/2013 | Kalai | G01C 21/32 |
| | | | | 345/522 |
| 2013/0147846 | A1* | 6/2013 | Kalai | G06T 1/60 |
| | | | | 345/660 |
| 2015/0187097 | A1* | 7/2015 | Savvopoulos | G01C 21/367 |
| | | | | 345/441 |

* cited by examiner

| GLOBAL IDENTIFIER | UR ID | PART ID | TILE ID |
|---|---|---|---|
| 13 | 3 | 314 | 314-008659 |
| 13 | 5 | 536 | 536-095349 |
| 13 | 9 | 751 | 751-313239 |
| | | | |

FIG. 5

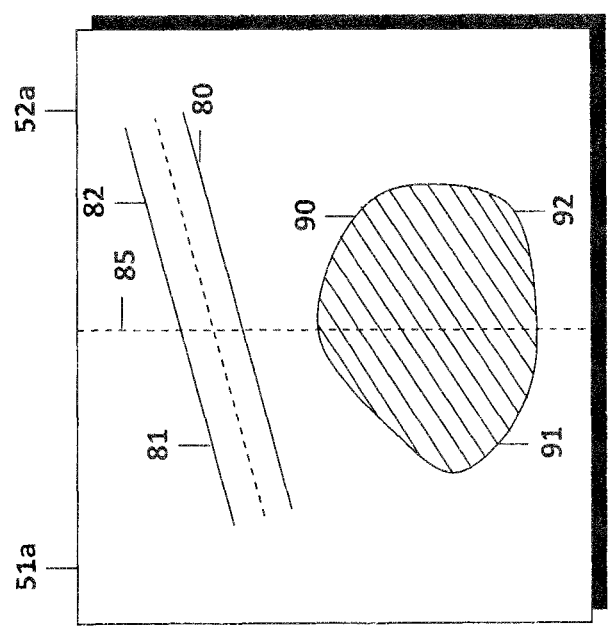

SEAMLESS DISPLAY OF OBJECTS

BACKGROUND OF THE INVENTION

1. Priority Claim

This application claims the benefit of priority from European Patent Application No. EP 12 187 621.3, filed on Oct. 8, 2012, which is incorporated by reference.

2. Technical Field

The disclosure relates to generation of a database of a geographical map used in a navigation device, display of an object in a navigation device, and to the navigation device.

3. Related Art

Navigation devices perform functions such as route searches between two locations. Modern navigation devices now also provide additional functionalities, such as serving as a travel guide, which outputs, upon demand, information on points of interests. Navigation devices furthermore may provide additional driver assist functions, such as advanced driver assist system functions.

SUMMARY

A system can generate a database of a geographical map of a navigation device. The geographical map can cover a geographical area which is divided into several update regions. At least one object in the geographical map can be identified. The object can cover an object area in the geographical area. The "object area" or "covered object area" defines that portion of the geographical area in the geographic map occupied by the object in the displayed geographical area. The object area may be divided into different parts located in different update regions based on conditions, such as the size of the object. Furthermore, for each of the one or more objects, information is stored in the database indicating that the object area overlaps with plural update regions. The information can include pointers to update regions in which the respective different parts of the object area are stored. With the database generated, the information about the different parts of the object, and especially the different parts of the object area, can be found more easily. In one example, the different parts of the object area for a particular object can be found as pointers or links, which allows identification and determination of where the other parts of the object areas are stored. The information that includes the pointers to the other update regions allow the system to determine whether the object area overlaps several update regions and the different parts of the object can be identified and determined faster and more easily. Furthermore, a navigation device using the generated database can display the object as a single object even though the object is in a number of different update regions. This helps to avoid the situation in which the different object areas located in the different update regions are displayed individually.

One possibile example embodiment to store the information is to store the information in a global table. The step of storing the information may include the step of assigning, for each identified object, a global identifier used by all update regions to identify the corresponding object, and storing in the global table, for each of the object areas of the identified object, identifiers for update regions in which the respective object areas are located. This global table can be used by all update regions. The global table can be used to identify and/or determine the different update regions and the different object areas where the different parts of the object are stored.

An example embodiment stores the information as an attribute of the part of the object area covered by the at least one object. The attribute can then point to at least one other update region in which another part of the object area is located. This attribute can be, for example, a flag provided at one part of the object area, which points to (or identifies) another part of the object area located in another update region.

In an example, the corresponding database containing map data representing the geographical area is divided into several update regions. The database containing the information for each of the objects indicates that the object area overlaps with plural update regions, the information can further include pointers to update regions in which the respective different parts of the object area are stored.

The system can display an object in a geographical map of a navigation device. The geographical map can cover a geographical area which is divided into several update regions. An object can be retrieved from the database containing the map data to be displayed. The object may cover an object area in the geographical area which is divided into different parts, which can be located in different update regions. Furthermore, the information stored in the database can be used to determine that the object area overlaps with one or more other update regions. The information includes pointers to update regions in which the respective different parts of the object area are stored. Furthermore, the object located in the different update regions can be displayed as a single object based on the different parts of the object areas. This displaying of the object first of all allows a fast displaying of the object, as information is provided in the different update regions in which the different parts of the object area are stored. Additionally, a seamless display of the object is possible, since the object is displayed as a single object and since the different object areas or parts of the object are not displayed separately or independently from one another.

The system relates to a navigation device that includes a database having map data of the geographical area. The geographical area can be divided into several update regions. The database may further include at least one object to be displayed in a geographical map. The at least one object can cover an object area in the geographical area which is divided into different parts, which are located in different update regions. The database can further include information indicating that the object area overlaps with one or more other update regions. The information includes pointers to update regions in which the respective different parts of the object area are stored. Furthermore, a display can be provided. The display can be configured to display the map data and the one or more objects. A processing unit can be coupled to the database and configured to generate a display of the map data and of the one or more objects. The processing device can be configured to retrieve from the database the information in which update regions the respective different parts of the object area are stored. In addition, the processing device can be configured to display the object located in the different update regions in which the object is located based on the different parts of the object area as a single object.

With the information provided, the processing device can learn that an object to be displayed includes parts located in different object areas. Using this information, the processing unit displays the object as a single object. This helps to avoid image artifacts which might occur when the different parts of the object would be displayed independently.

It should be noted that the features mentioned above and those to be explained below can be used not only in the respective combinations indicated, but also in any other combination or in isolation.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The foregoing and other features of embodiments will become more apparent from the following detailed description of the embodiments when read in conjunction with the accompanying drawings. In the drawings like reference numerals refer to like elements.

FIG. 5 shows an example of a global table where the information is stored in which update regions of respective object areas are located.

FIG. 8 shows an example of two objects displayed using a navigation device.

DETAILED DESCRIPTION OF THE PREFERRED EMBODIMENTS

Various embodiments described herein can be used alone or in combination with one another. The following detailed description describes only a few of the many possible implementations of the present embodiments. For this reason, this detailed description is intended by way of illustration, and not by way of limitation.

In order to address the increasing demand for up-to-date databases for navigation systems, which reflect recent changes in road networks or any object in the database, different approaches may be pursued. In one approach the geographical area used by a navigation device contains several update regions. An update region may be a country or part of a country, for example for a navigation device that includes map data of Europe, each country may be an update region. An update region can specify a geographical area of the database that may be subject to an update.

Figure 1:
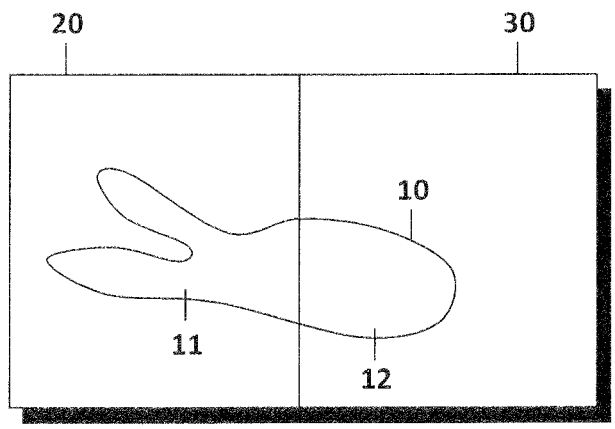
FIG. 1 is a schematic view of an example object located in two different update regions.
Figure 2:
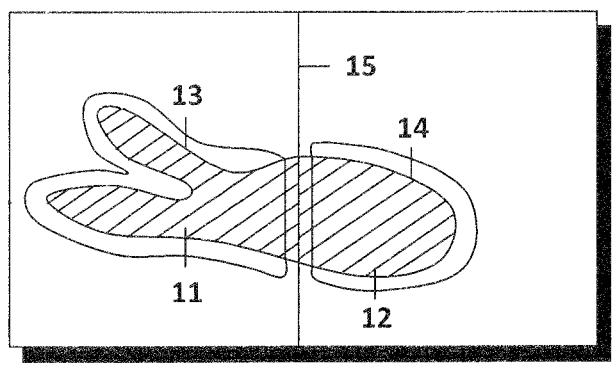
FIG. 2 is a schematic view of the object of FIG. 1 indicating an example of different object areas of the object displayed independent from another.

From the concept of using update regions it follows that the visual content of the geographical map should be separated at the borders of the update regions. Thus, an object such as a road segment, a point of interest, a 3D landmark or any other object representing a geographical part of the region, such as forests, lakes, should be separated at the borders of the update regions. The different parts of the object can then be stored in separate update regions. By way of example, the Lake of Constance as an object might be divided into different parts located in different update regions and a part of the object may be stored in the update region Germany, another part in the update region Austria and a third part in the update region Switzerland. However, when the user uses the navigation device and if the object located on the border of the update regions such as the lake has to be displayed on the display, this object has to be displayed free of artifacts in a seamless way, in other words displayed as a single object. The different parts of the object can be stored independently from one another in the different update regions. The displaying of such a composed object, the different parts of which are located in different update regions, can be time-consuming, as the navigation device has to identify the different update regions and the different parts of the object in the different update regions. Furthermore, during display the following problems may occur:

As shown in the example of FIG. 1, an object such as a lake 10 may be located in different update regions 20 and 30. The different update regions may belong to different areas, such as countries, however the different update regions may also belong to the same region, such as a country. For displaying the object 10, such as a lake, an urban agglomeration, a road, a polygon or a 3D element, the different parts of the object, here part 11 and part 12, may be displayed in a sequential order. Furthermore, the display of the two different parts of the object may lead to image artifacts. By way of example, if the displayed object contains an outline as shown in the example of FIG. 2, the outline 13 of one part of the object in a first region, and the outline 14 of another part of the object in a second region would lead to a border 15 at the border of the two outlines. Furthermore, if a texture, such as the illustrated hatched area, is used to display the object, the situation may occur that the texture shown in one part of the object does not match the texture shown in the other part of the object. In the example embodiment of FIG. 2, the texture of part 11 is not in line with the texture of part 12.

Figure 3:
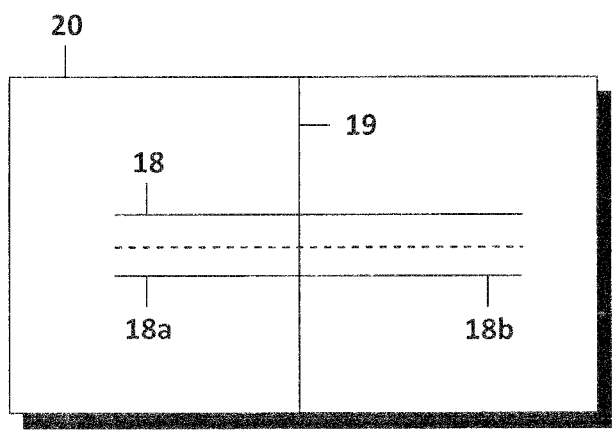
FIG. 3 is a schematic view of an example road segment located in different update regions.

As shown in the example of FIG. 3, a similar problem may occur when displaying an object such as a road 18, which has a part 18a of the road located in one update region, whereas the other part 18b of the road is located in the other update region. If the different parts of the road are displayed individually, problems may occur at the border 19 of the two road parts 18a and 18b.

Figure 4:
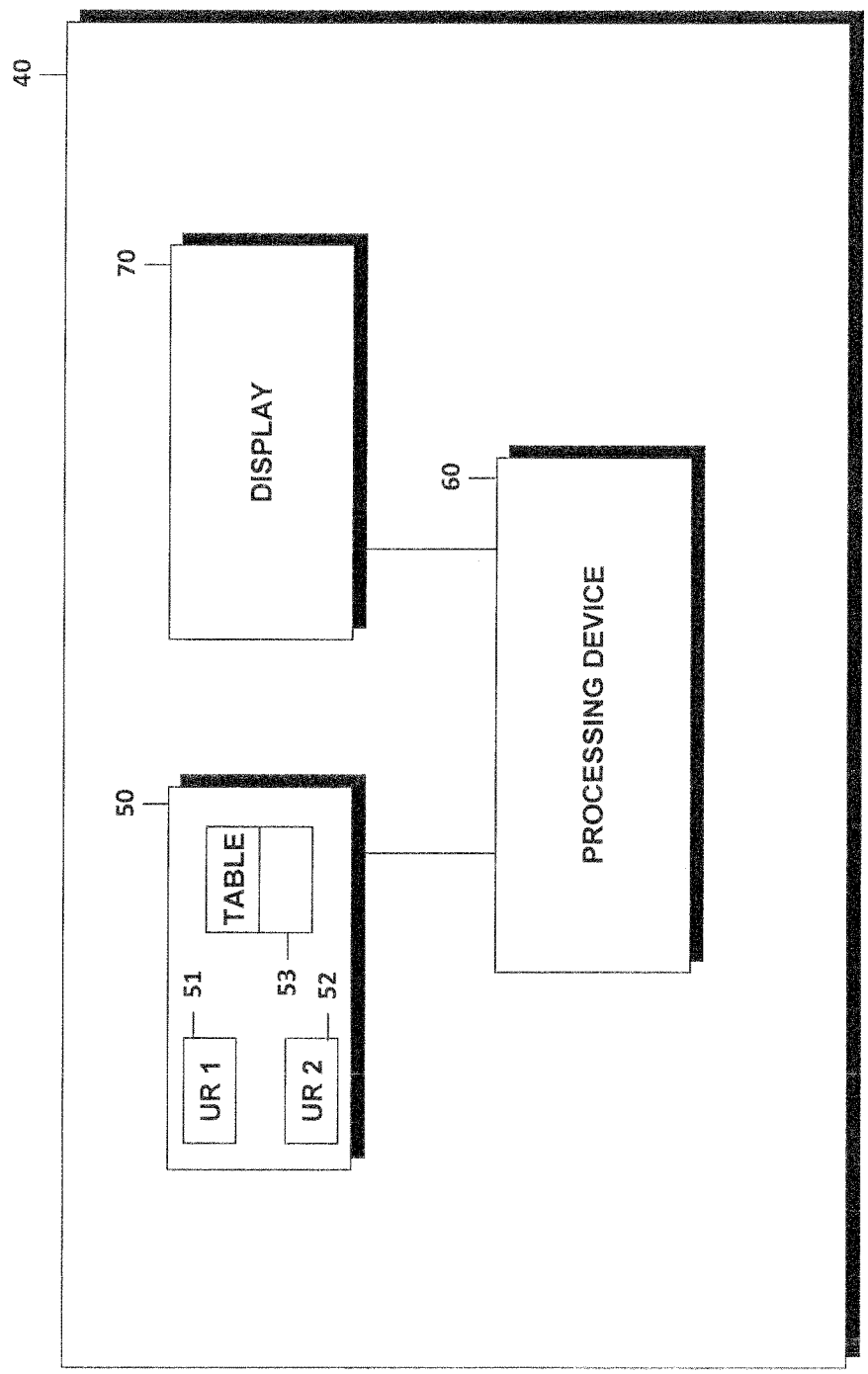
FIG. 4 shows an example navigation device.

FIG. 4 is a schematic illustration of an example navigation device 40 which can be used in a vehicle or which can be a hand-held navigation device used by a pedestrian. The navigation device 40 includes a database 50 where a digital map covering a geographical area is stored. The data map can be stored in different update region tables 51, 52, each update region can cover a certain part of the geographical area. An update region can be displayed using an update-region table. Each update region may contain the map data of a certain country or of a certain part of a country. The database 50 may be updated in such a way that a full update is carried out, where all update region tables 51, 52 are updated or a partial update where only an update region or a selected group of update regions are exchanged, added or removed. It should be understood that also a smaller update is possible where parts of an update region are replaced, added or removed from the database. The principle of the update is such that after the update the entire navigation database should be consistent. The navigation device furthermore comprises a processing device 60, or processor, which controls the functioning of the navigation device. Furthermore, a display 70 is provided on which the displayed navigation information, such as the geographical area or points of interest or any other information may be displayed.

The navigation device may also include a memory. The memory may include, but is not limited to computer readable storage media, or machine readable media, such as various types of non-transitory volatile and non-volatile storage media, including but not limited to random access memory, read-only memory, programmable read-only memory, electrically programmable read-only memory, electrically erasable read-only memory, flash memory, magnetic tape or disk, optical media and the like. The memory is operable to store data and instructions executable by the processor. The functions, acts or tasks illustrated in the figures or described may be performed by or in connection with the programmed processor executing the instructions stored in the memory. The functions, acts or tasks may be independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

The processing device can control the operation of the navigation device according to control instructions which may also be stored in the database or in any other part of the memory. The processing device 60 may comprise a central processing unit, for example in the form of one or more microprocessors, digital signal processors or application-specific integrated circuits. The database can be stored in the memory which may comprise any one or any combination of various types of storage or memory media, such as a random access memory, flash memory, hard disk memory, removable memories, such as a compact disk, a DVD, a memory card or the like. In an example, the memory includes a cache or random access memory for the processor. In addition or alternatively, the memory may be separate from the processor, such as a separate cache memory of a processor, the system memory, or other memory. The memory may also in*clude (or be) an external storage device or database for storing data.

It should be understood that the navigation device 40 may include additional components, such as a position sensor, a vehicle interface, and/or an input/output interface. The position sensor may be adapted to determine the current position of the vehicle or of the navigation device. The position sensor may comprise a GPS sensor, a Galileo sensor or a position sensor based on mobile communications networks or the like. The processing device may execute instructions stored in memory to perform navigation related functions, such as to determine the fastest or shortest route to a predefined destination. Other components may be provided which were, however, omitted for the sake of clarity, as only those components are discussed which are helpful for the understanding of the embodiments.

Each component or unit described herein is hardware, or a combination of hardware and software. For example, each component may include and/or initiate execution of an application specific integrated circuit (ASIC), a Field Programmable Gate Array (FPGA), a circuit, a digital logic circuit, an analog circuit, a combination of discrete circuits, gates, or any other type of hardware, or combination thereof. Accordingly, as used herein, execution of a component by a processor can also refer to logic based processing by the component that is initiated directly or indirectly by the processor to complete a process or obtain a result. Alternatively or in addition, each component can include memory hardware, such as at least a portion of a memory, for example, that includes instructions executable with a processor to implement one or more of the features of the component. When any one of the components includes instructions stored in memory and executable with the processor, the component may or may not include the processor. In some examples, each component may include only memory storing instructions executable with a processor to implement the features of the corresponding component without the component including any other hardware. Because each component includes at least some hardware, even when the included hardware includes software, each component may be interchangeably referred to as a hardware component.

In the following, different examples are discussed regarding how an object, such as the object 10 or 18 as shown in FIG. 1-3, can be displayed in an effective way with short processing time and without errors, i.e. image artifacts. One possibility is to provide a global table 53 shown in FIG. 4. An example of a global table 53 is shown in more detail in FIG. 5. This global table can be valid for all update regions. Each object, the different parts of which are located in different update regions, can have a global identifier 53a used by all subregions. In the example shown, the global identifier 13 identifies the object which, in the example shown, is composed of three different parts located in three different update regions. The table furthermore identifies the different update regions with an update region identifier 53b (UR ID), here named update regions 3, 5 and 9. The object can have an object area located in the different update regions. Each part of the object located in an object area has an identifier 53c (Part ID), which provides identification of the part of the object. In the following, object part and the part of the object area covered by an object part are used as synonyms. In the embodiment shown, the identifier 53c for the part of the object area located in an updated region, is, in the example shown, 314 for the first update region, 536 for the second update region and 751 for the third update region. The different update regions may be further divided into different subregions, such as tiles. The global table may furthermore contain a tile ID 53d where the corresponding object area is located.

The example table shown in FIG. 5 can then mean that the object, e.g. the Lake of Constance, may have the global identifier 13. Furthermore, it can be deduced from the global table that one part of the object/Lake of Constance having the ID 314 is located in the update region having the update region ID 3. The second part of the Lake of Constance having the identifier 536 is located in the update region 5 and a third part of the object with the identifier 751 for the corresponding update region 9 is located in the update region 9.

As specified in connection with FIG. 4, the database contains the update region tables 51 and 52. In more general terms, for each one of the update regions at least one database table 51, 52 may be stored and for each of the objects which are located in different update regions the information stored in the database includes pointers to database tables 51, 52 of all update regions with which the object area overlaps or includes. This helps to identify the update regions with which the object area overlaps.

Furthermore, the step of storing the information can include the steps of determining, for each of the objects, identifiers 53c for the different parts of the object area in the database tables of the update regions in which the respective parts are located, and storing the determined identifiers 53c in a global table. Applied to the embodiment shown in FIG. 5, the identifiers are the part IDs 314, 536 or 751 shown in FIG. 5.

An alternative to the global table would be to use an attribute directly attached to the different identifiers 53c, so as to be associated with the different parts of the object. Applied to the example shown in table 5, in this embodiment, the part of the object area 314 may contain an attribute, such as an identifier or flag associated with part 536 in update region 5. The part of the object area 536 would then have an attribute, such as an identifier or flag pointing to part 751 in update region 9 and part 751 would have an attribute, such as an identifier or flag pointing to part 314 in update region 3.

The attribute may point to, or identify, one or more of the other parts of the object area. Thus, the global table 53 is one possibility to link the different parts of the object area together. However, it is not the only possibility and the global table needs not necessarily be provided, as attributes may be provided at the different parts.

It should be understood that further embodiments may be used allowing the navigation device to determine where the different parts of an object located in different object areas are stored.

In FIG. 8, a schematic view of an example display image is shown generated by a navigation device 40, such as the navigation device 40 shown in FIG. 4, using the information provided in the database that an object is located in different update regions. In FIG. 8, an update region 51a is displayed using update region table 51 (FIG. 4) and update region 52a is displayed using update region table 52 (FIG. 4). The dashed line 85 illustrated in FIG. 8 indicates the border between the two update regions. In the example shown, a road segment 80 having an object area which is divided into a first part 81 located in the first update region 51a and an object area 82 located in the second update region 52a can be displayed in a seamless way since the processing device 60 of the navigation device 40 has identified and determined that the road segment should be displayed as a single object. Furthermore, as a further object 90 in the display image, a hatched area is shown which could be a lake or a forest located on both sides of the border. The object 90 has a first part of the object area 91 being located in the first update region 51a, the second part of the object area 92 being located in the second update region 52a. In this example, the object is displayed with a hatched area. As the processing device knows that the two object areas 91 and 92 belong to a single object, the processing device can display the object 90 in such a way that no artifacts occur at the border of the two parts.

Figure 6:
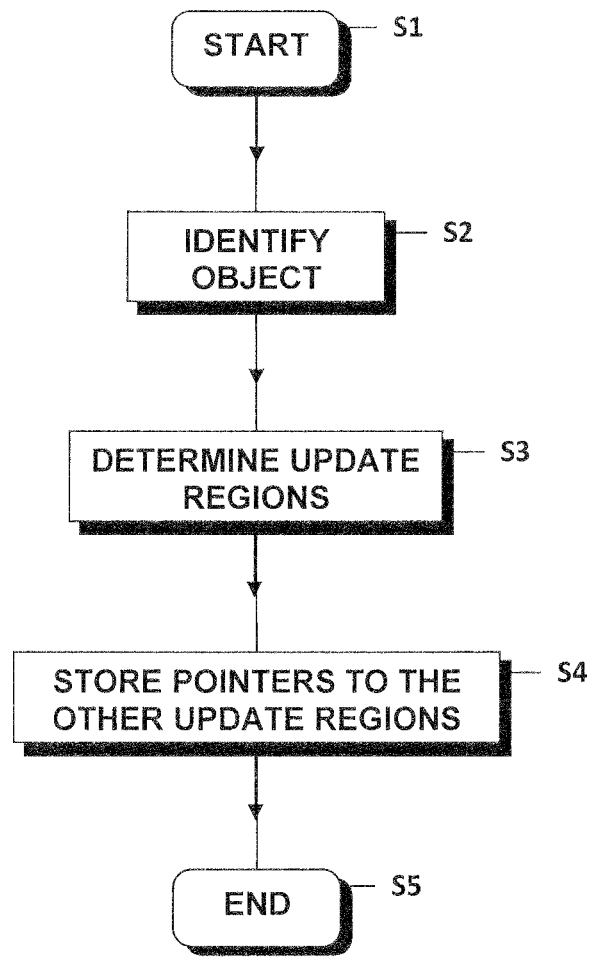
FIG. 6 is a flowchart of an example operation to generate a database of an object.

In FIG. 6 a flowchart includes example operational steps for generating a database as shown in FIG. 4. The operation can start in step S1. In step S2 the objects may be identified in a geographical area that are located on the border, and/or both sides of the border, of two update regions, and which cover an object area provided in different update regions. Furthermore, the different parts of the object area are determined. In the next step S3 the different update regions in which the different parts of the object are located are determined. In the next step S4 pointers to the different update regions are stored. These pointers link one part of the object area to at least one other part of the object area located in another update region. As previously described, step S4 may represent the step of generating a global table as shown in FIG. 5 or may represent the storing of attributes pointing to other update regions, such as pointing to one other part of the object area.

The steps S2 and S4 can be carried out for all objects which cover an area located in different update regions, the operation may end in step S5.

Figure 7:
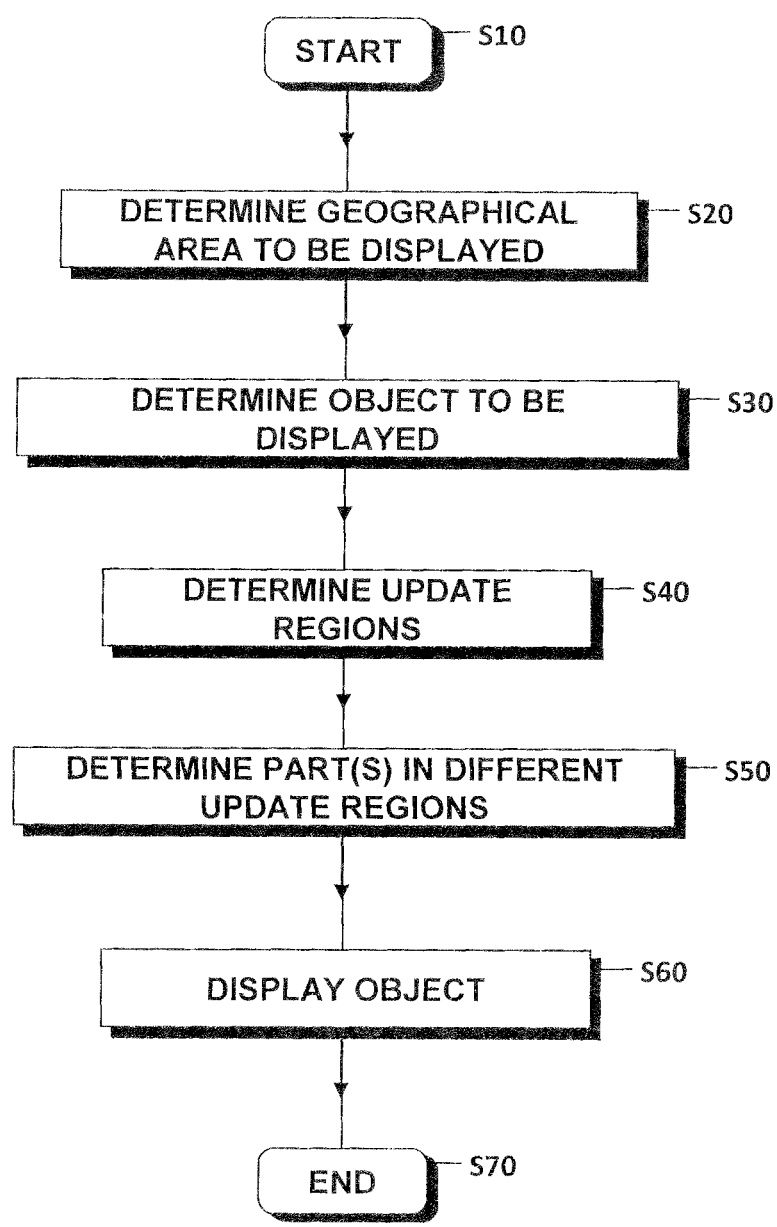
FIG. 7 is a flowchart of an example operation to display objects located in different update regions.

In connection with the example operation depicted in FIG. 7 the steps are shown which can be used to display an object that has been stored. The method can start in step S10. In a navigation device a geographical area is displayed. The displayed area may be the area where the navigation device is located or may be any other area defined by a user (step S20). In a further step S30 an object is determined which falls under the category mentioned above, meaning that the object is composed of different parts, each part having an object area located in a different update region. When the object to be displayed has been determined, the corresponding update regions in which the different object areas are located (step S40) and are determined in step S40. In each of the update regions the part of the object, which is the part of the object area to be displayed is identified. Going back to the example of FIG. 5 this means that in step S50 the parts 314, 536 and 751 are identified. These three parts are composed by the processor device to generate a single object in step S60 for display. This displaying of the object as a single object additionally has the advantage that the displayed object is not named two or three times due to part of the object area being in different update regions. By way of example, if the different parts of the object were displayed independently from one another, the situation could occur that each part of the object is named individually. If the object is named in the different update regions with a different name, the situation could occur that one part of the object is named in one language whereas the other part is named in another language when different languages are used in the different update regions. All these problems are avoided when the object is understood by the processing device as a single object, the processing device may retrieve the different parts of the object from the different update regions using the information that links the different parts to one another.

The method of FIG. 7 ends in step S70. The steps shown in FIG. 7 may be carried out for each of the objects, parts of which are located in different update regions.

While various embodiments have been described, it will be apparent to those of ordinary skill in the art that many more embodiments and implementations are possible within the scope of the invention. Accordingly, the invention is not to be restricted except in light of the attached claims and their equivalents.

We claim:

1. A method for generating a database of a geographical map of a navigation device, the method comprising the steps of:

identifying, via a processor, an object in the geographical map, the geographical map being divided into a plurality of update regions, wherein the object is divided into different parts, and each different part is stored in a different update region included in the plurality of update regions; and storing in the database, via the processor, information indicating that the object overlaps two or more update regions included in the plurality of update regions, wherein the information comprises a plurality of memory pointers, and each memory pointer included in the plurality of memory pointers comprises a memory address of a different update region included in the two or more update regions, and wherein, for each of the update regions, at least one different database table is stored, and the plurality of memory pointers points to the database tables of all update regions that are overlapped by the object, wherein the information is implemented by the navigation device to determine that the object overlaps the two or more update regions, and to combine the different parts of the object and display the object as a single seamless object in the geographical map based on positions of the corresponding parts of the object in the corresponding update regions.

2. The method of claim 1, wherein the information is stored in a global table, and storing the information comprises assigning, via the processor, a global identifier used by all update regions to identify the object, and storing in the global table identifiers for update regions in which the different parts of the object are stored.

3. The method of claim 2, wherein storing the information comprises determining, via the processor, identifiers for the different parts of the object in the database tables of the update regions in which the respective parts are located, and storing, via the processor, the determined identifiers in the global table.

4. The method according to claim 1, wherein, for each of the different parts of the object, the information is stored as an attribute of the part of the object, the attribute pointing to at least one other update region in which another part of the object is stored.

5. The method according to claim 4, where the attribute points to one of the other parts of the object.

6. The method according to claim 1, wherein the information is provided as an attribute of a first part included in the different parts of the object, the attribute pointing to at least one other update region in which a second part included in the different parts of the object is stored, and the method further comprises using the attribute to combine the first part of the object and the second part of the object to display the entirety of the object on a display.

7. The method according to claim 1, wherein identifying the object in the geographical map comprises dividing the object into the different parts which are located in the different update regions, and associating the different parts with each other.

8. The method of claim 1, wherein the plurality of memory pointers comprises a different memory pointer for each of the update regions overlapped by the object.

9. A non-transitory computer readable medium containing a geographical map of a navigation device, the non-transitory computer readable medium comprising:
a database comprising map data associated with the geographical map which is divided into a plurality of update regions,
an object located in the geographical area and associated with the map data, wherein the object is divided into different parts, and each different part is stored in a different update region included in the plurality of update regions, and
the database further comprising information indicating that the object overlaps two or more update regions included in the plurality of update regions, the information comprises a plurality of memory pointers, wherein each memory pointer included in the plurality of memory pointers comprises a memory address of a different update region included in the two or more update regions, and wherein, for each of the update regions, at least one different database table is stored, and the plurality of memory pointers points to the database tables of all update regions that are overlapped by the object,
wherein the information is implemented by the navigation device to determine that the object overlaps the two or more update regions, and to combine the different parts of the object and display the object as a single seamless object in the geographical map based on positions of the corresponding parts of the object in the corresponding update regions.

10. The non-transitory computer readable medium according to claim 9, further comprising a global table, wherein the global table contains a global identifier used by all update regions to identify the object, the global table further comprising identifiers for the update regions in which the different parts of the object are stored.

11. The non-transitory computer readable medium according to claim 10, where the global table includes identifiers for the different parts of the object in the database tables of the update regions in which the respective parts are located.

12. The non-transitory computer readable medium according to claim 9, wherein, for each of the different parts of the object, the information is provided as an attribute of the part of the object, the attribute pointing to at least one other update region in which another part of the object is stored.

13. A method for displaying an object in a geographical map of a navigation device, the method comprising the steps of:
retrieving, via a processor, an object from a database, the database containing map data to be displayed, the geographical map being divided into a plurality of update regions, and the object being divided into different parts, wherein each different part is stored in a different update region included in the plurality of update regions,
determining, via the processor and based on information stored in the database, that the object overlaps two or more update regions included in the plurality of update regions, wherein the information comprises a plurality of memory pointers, and each memory pointer included in the plurality of memory pointers comprises a memory address of a different update region included in the two or more update regions, and wherein, for each of the update regions, at least one different database table is stored, and the plurality of memory pointers points to the database tables of all update regions that are overlapped by the object, and
combining the different parts of the object to display, via the processor and on a display, the object as a single seamless object included in the geographical map based on positions of the corresponding parts of the object in the corresponding update regions.

14. The method according to claim 13, wherein determining that the object overlaps the two or more update regions comprises determining that a first part of the object will be displayed based on a memory pointer that corresponds to the first part of the object pointing to an update region in which a second part of the object is disposed.

15. A navigation device comprising:
a memory configured to store a database comprising map data associated with a geographical map which is divided into a plurality of update regions, the database further comprising an object to be displayed on the geographical map, wherein the object is divided into different parts, and each different part is stored in a different update region included in the plurality of update regions, the database further comprising information indicating that the object overlaps two or more update regions included in the plurality of update regions, the information comprises a plurality of memory pointers, and each memory pointer included in the plurality of memory pointers comprises a memory address of a different update region included in the two or more update regions, and wherein, for each of the update regions, at least one different database table is stored, and the plurality of memory pointers points to the database tables of all update regions that are overlapped by the object;

a display;

a processor in communication with the memory and configured to display, via the display, the map data and the object, wherein the processor is further configured to:

retrieve from the database the information indicating within which update regions the respective parts of the object are stored, determine, based on the information, that the object overlaps the two or more update regions, and combine the different parts of the object to display a single seamless object based on positions of the corresponding parts of the object in the corresponding update regions.

16. The navigation device of claim 15, wherein the database includes a plurality of sub-region identifiers for each update region, the sub-region identifiers indicative of a location within a respective update region of the part of the object included in the respective update regions.

\* \* \* \* \*